Dec. 30, 1930.     H. F. SAUTTER     1,787,020
PACKING FOR RODS AND SHAFTS
Filed Sept. 14, 1926
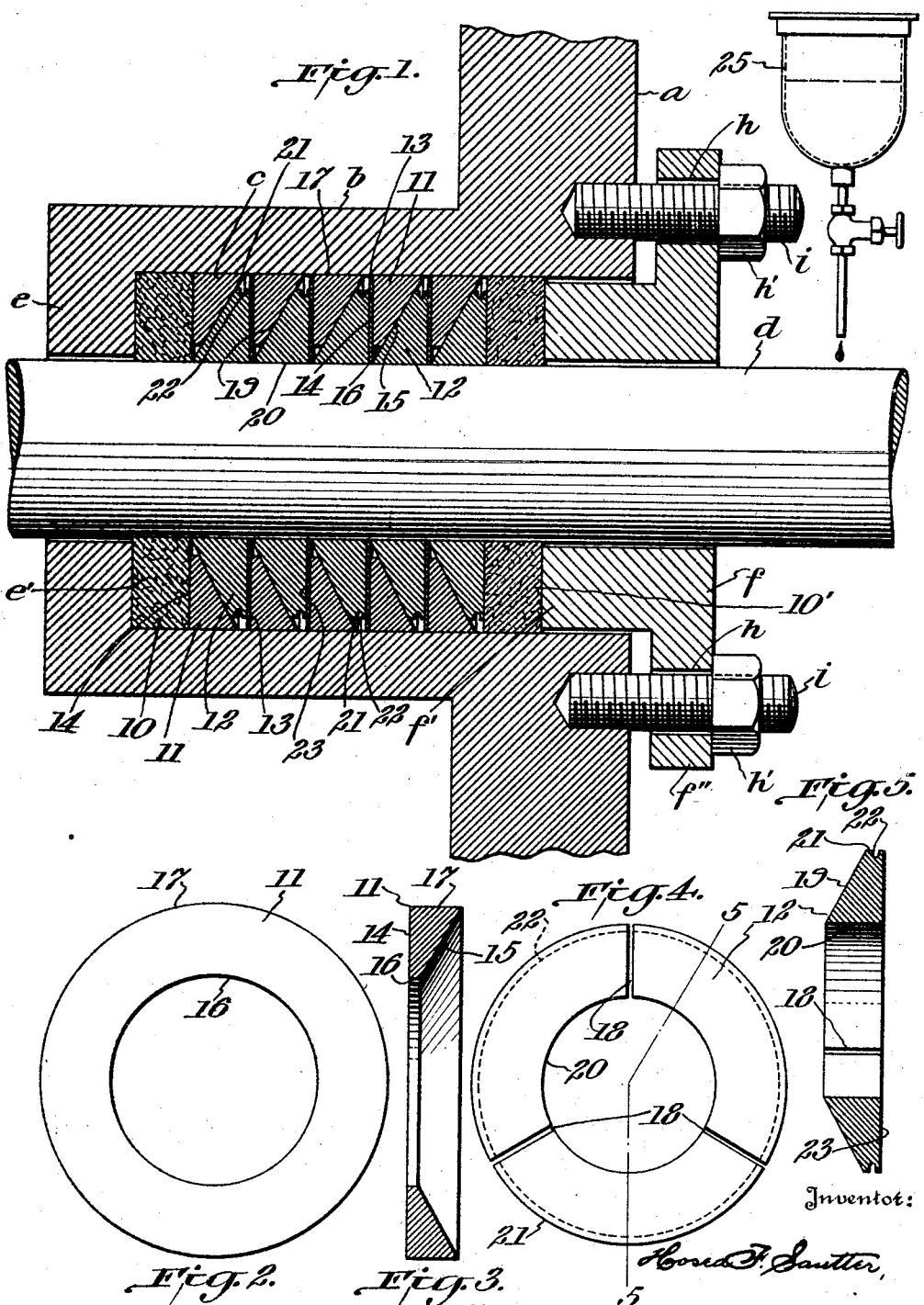

Patented Dec. 30, 1930

1,787,020

UNITED STATES PATENT OFFICE

HOSEA F. SAUTTER, OF FORT WORTH, TEXAS, ASSIGNOR TO THE LINDE AIR PRODUCTS COMPANY, A CORPORATION OF OHIO

PACKING FOR RODS AND SHAFTS

Application filed September 14, 1926. Serial No. 135,418.

This invention relates particularly to a metallic packing for the high pressure piston rods of fluid compressing machines, although it may be used on other rods as will be apparent.

In the operation of extracting helium from natural gas, considerable trouble has been encountered in obtaining a suitable packing for the rods of the natural gas and nitrogen compressors, as the diameter and velocity of the rods and plungers is greater than has been encountered in other work. Furthermore, in the compression of natural gas, the natural gas, especially under high pressure, has a solvent action on some of the ingredients of many of the common packings causing them to disintegrate. In an effort to obtain a satisfactory packing most of the well known commercial packings were tried and had to be discarded as unsuitable. Some of them lasted but a few hours and others never stopped leaking. Metallic packings failed because when tightened enough to prevent leakage they either flaked off and the loosened particles clogged the compressor valves or they fused to the piston rods so it was necessary to dismantle the cylinders and remove the rods under a hydraulic press. The non-metallic packings failed because the high pressure within the cylinders blew holes through them and when they were strengthened to prevent this they scored the rods, which destroyed their effectiveness. Therefore, the object of this invention is to produce a packing that will withstand higher piston rod speeds and cylinder pressures than those heretofore encountered. Also, one that is less expensive, easier to install and more economical to maintain in working condition than those heretofore in use.

The construction and operation of this improved packing will be more clearly understood by referring to the accompanying drawings which form a part of this application, and in which:

Fig. 1 is a sectional view of an improved packing embodying this invention, assembled in a typical stuffing box;

Figs. 2 and 3 are, respectively, a plan and a sectional view of one of the solid metal rings of this improved packing; and Figs. 4 and 5 are, respectively, a plan and a sectional view of one of the multi-segment rings of the same.

In the drawing, $a$ designates a portion of a cylinder head carrying an inwardly extending stuffing box having a cylindrical outer wall $b$ and a bore $c$ somewhat larger than the diameter of the piston rod $d$ which passes through it, and an inner end wall $e$ having a bore loosely fitting the rod $d$ and a flat bottom surface $e'$ forming a seat for the packing which will be described later. An adjustable closure for the outer end of the bore $c$ is formed by the gland $f$ having an outturned flange $f''$ in which are holes $h$ which slide over the studs $i$ secured in the cylinder head $a$. Nuts $h'$ on the studs $i$ bear against the flange $f''$ to force its cylindrical portion $f'$ into the space between the bore $c$ and the rod $d$, where it is a sliding fit. The stuffing box just described is adapted to hold the improved packing and, being of a form well known in the art, needs no further description. Its diameter may be varied to suit the size of the rod passing through it and its length may be varied to receive the number of packing rings necessary to hold the cylinder pressure with which it is used.

Broadly speaking, the improved composite packing consists of a multiple assembly of three-element units disposed between two end packing rings 10, 10', the ring 10 bearing against the bottom $e'$ of the stuffing box and the ring 10' abutting against the inner end $f'$ of the gland. The rings 10, 10' may consist of relatively thick resilient material such as spongy asbestos,—Garlock split packing rings No. 550 have been found suitable but other rings of a similar nature may be used. These rings desirably are rectangular in cross-section and closely fit the piston and the bore of the stuffing box. Each of the three-element units consists of (1) a one-piece hard metal ring 11; (2) a multi-segment ring 12 of softer metal, desirably comprising three or more similar segments; and (3) a flat ring gasket 13 of relatively hard resilient packing.

The solid ring 11 has a flat side 14 which, in each unit, is perpendicular to the axis of the rod *d* and faces toward the high pressure side of the packing. The opposite side 15 of this ring is beveled so as to leave a narrow inner circular edge 16 that is of substantially greater diameter than the piston rod *d* so as not to touch the rod when the latter is operating. The outer circular edge or face 17 of this ring is much wider than the edge 16, and its diameter is such that the ring 11 has a fairly snug sliding fit in the bore *c* of the stuffing box. The cylinder pressure or other pressure to be packed is exerted against the ring 11 which moves axially a slight amount and transmits such pressure to the multi-segment ring 12 through the beveled side 15 that is in contact with the ring 12 and faces toward the rod *d*.

The multi-segment ring 12 is complementary to the ring 11, substantially fitting between the latter and the rod *d* so as to provide a unit that is approximately rectangular in cross-section. As shown, the ring 12 may be divided or split into three segments of substantially equal size by three radial separating cuts or joints 18. One side 19 of this ring is beveled the same degree as the side 15 of the ring 11 that interfits therewith, the beveled side 19 facing away from the rod *d* so that any pressure on the ring 11 will tend to force the inner curved sides 20 of the segments of the ring 12 inwardly against and into fluid-tight sealing relation with the rod while the latter is reciprocating. The outer side 21 of the multi-segment ring is considerably narrower than the side 20, and is also somewhat smaller in diameter than the bore *c* and may be provided with a groove 22 to receive a cord or wire to hold the segments in place in assembling the same on the rod. The number and form of the separating cuts may be varied, as their main function is to compensate for the wear of the side 20 and to permit the bore of this ring to be brought into good sealing contact with the rod at all times, hence there may be two or more cuts of various shapes.

It is important that the multi-segment or split ring that engages and seals the rod shall be of substantially softer metal composition than the outer metal ring that cooperates therewith. I have found that a suitable alloy for making this split ring may consist of about 14.5% of tin and 85.5% of lead; and that a suitable alloy for making the outer ring may consist of about 31.5% of tin and 68.5% of lead. Of course, these proportions and materials may be varied, the essential purpose being to provide a suitable soft metallic inner ring that shall pack the rod without excessively frictionally heating the latter or fusing to it, and a harder outer metallic ring that shall be capable of withstanding high cylinder pressure and transmit the same to the inner ring without failure or undue wear. It is furthermore desirable to coat the cooperating beveled sides 15 and 19 with a suitable lubricant so they will freely slide relatively to one another without substantial friction or wear under high contact pressures. This may be done in preparing the rings by first applying a mixture of shellac and graphite to the surfaces 15 and 19 which, after drying, are scraped smooth, leaving a thin layer of graphite on such beveled surfaces. Other lubricating coatings may be used or, in some cases, the same may be entirely omitted.

The third element of each unit consists of a one-piece ring or gasket 13 of relatively hard sheet packing that closely fits the exterior of the rod and the bore of the stuffing box and has one side in contact with the flat radial side 23 of the ring 12. Any hard commercial sheet packing other than rubber and which is slightly compressible and resilient but does not disintegrate or flake off, may be used for this ring,—Garlock 900 and that sold under the trade name of "Durabla," which consist of compressed asbestos fiber, mica and graphite, having been found satisfactory. The principal function of the sheet packing gasket is to arrest leakage past the ends of the segments of the multi-segment ring and also to arrest leakage along the rod and the wall of the stuffing box, the gasket being squeezed radially by the pressure of the interfitting metallic rings into tight contact with both rod and wall. However, the operation of the rod in some cases wears off the inner edge of this gasket until it is not very effective in packing along the rod, the packing of the latter being practically entirely dependent upon the multi-segment ring or rings.

In assembling the packing in the stuffing box, the ring 10 of spongy asbestos packing about one half inch thick is placed in the bottom of the stuffing box against the wall *e'*. The thickness of this ring may be varied somewhat but its width radially should be sufficient to substantially fill the space between the bore *c* and the rod *d*. Next, a metal ring 11 is inserted so its radial side 14 abuts against the ring 10. Then a multi-segment ring 12 is inserted with its beveled side opposed to and within the beveled portion of the ring 11. A gasket 13 is then placed against the radial side 23 of the multi-segment ring. The number of these three-element packings to be inserted is dependent upon the pressure in the cylinder that communicates with the stuffing box, and upon the size and velocity of the rod and the nature of the fluid within the cylinder. The packing disclosed is especially adapted to withstand very high cylinder pressures, one thousand pounds per square inch and upwards, but may also be applied for packing lower pressures. For most pressures with which it is used, it is desirable to employ a plurality of three-element packings, and in the stuffing box disclosed, five such three-element units are inserted in series in the manner just described, except that the radial side of the second and following rings 11 bear against a gasket 13 of the preceding unit and the inner side of the soft packing 10' bears against the radial side of the last multi-segment ring in the series. Finally, the gland $f$ is set in place and secured by the nuts $h'$, preferably so that it only bears with a moderate pressure against the ring 10' and evenly pushes the several units and rings 10, 10' into proper positions and alinement. It is unnecessary to tightly compress the packing with the gland $f$ as the sealing action of the packing appears to be practically independent of the gland pressure upon it, the gland serving principally as an end abutment and retainer for the packing. By thus applying a much lower pressure than usual through the gland, deformation of the packing material and excessive friction against the rod are avoided. Lubrication for the packing may be supplied by a lubricator 25 which drops oil onto the rod just outside the gland $f$.

In operation, the fluid pressure from within the cylinder prevails over the radial side 14 of the first ring 11 adjacent the cylinder, forcing said ring against the adjoining multi-segment ring 12. The beveled sides of these two rings are in contact and cooperate to radially press the side 17 of the outer ring against the bore $c$ and the side 20 of the inner ring against the rod $d$. On any one segmental ring element, the intensity of mean fluid pressure between the rod and this element is less than that obtaining between its outer thinner edge and the bore $c$, which latter pressure also permeates between the beveled sides which are not in absolute contact at every point. This difference of total pressures, acting radially inward on each segment of this ring, combined with a radial inward force resulting from the action, at the beveled surfaces in contact, of the transmitted fluid pressure over the ring next to the cylinder, causes the segment to move inward into close contact with the rod to effectively pack the rod. The pressure of the radial side 23 of the ring 12 against the gasket 13 squeezes the latter radially into tight contact with the bore $c$ and the rod $d$. The leakage of pressure past the cooperating rings and gasket is thus practically prevented by one unit, in the case of lower pressures, and by a series of such units in the case of higher pressures,—the leakage past one unit being partially or entirely held back by the next unit, the final unit under high pressures substantially stopping the leakage, so that a pressure gradient is established from the cylinder to the gland.

The remarkable success of the improved packing is apparent from the fact that the best of many packings tried prior the one herein disclosed gave a maximum of about 1000 hours service and averaged considerably less than that when replacement became necessary, whereas an improved packing embodying this invention is still operating satisfactorily under the same service conditions after more than 4800 hours of actual operating service and shows no need of replacement. While I am unable to give an entire explanation for this superior effectiveness of my packing, the principle reason appears to be that the fluid pressure and its gradient along the assembly acts on the hard metal rings 11 to force the freely movable segments of the softer metal rings 12 inward to pack the rod $d$ and to force the gasket 13 outward to pack the bore $c$. Although the improved packing is described in detail, it will be understood that various changes may be made herein without departing from the spirit of the invention or sacrificing its advantages.

I claim:

1. A high-pressure packing comprising outer and inner packing rings having complementary beveled sides in contact; said rings being composed respectively of two different lead alloys, the outer ring containing a lower percentage of lead and being materially harder than the inner.

2. A high-pressure packing comprising outer and inner packing rings having complementary beveled sides in contact; said rings being composed respectively of two different alloys of lead and tin, the outer ring containing a lower percentage of lead and being materially harder than the inner.

3. A high-pressure packing comprising outer and inner packing rings having complementary beveled sides in contact; said rings being composed respectively of two different alloys of lead and tin, the outer containing approximately 31.5% tin and the inner approximately 14.5% tin.

4. In combination, a metal packing ring having one side conically dished, and a split ring having a convex surface interfitting with said dished surface, the two rings being composed of two different lead-tin alloys with the split ring having a materially lower tin content.

In testimony whereof, I affix my signature.

HOSEA F. SAUTTER.